Figure 6:
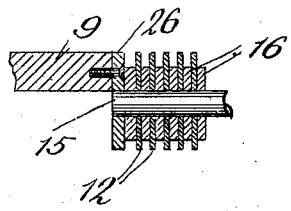

No. 800,426. PATENTED SEPT. 26, 1905.
A. B. CALKINS.
CIRCULAR SAW.
APPLICATION FILED AUG. 2, 1904.
3 SHEETS—SHEET 1.
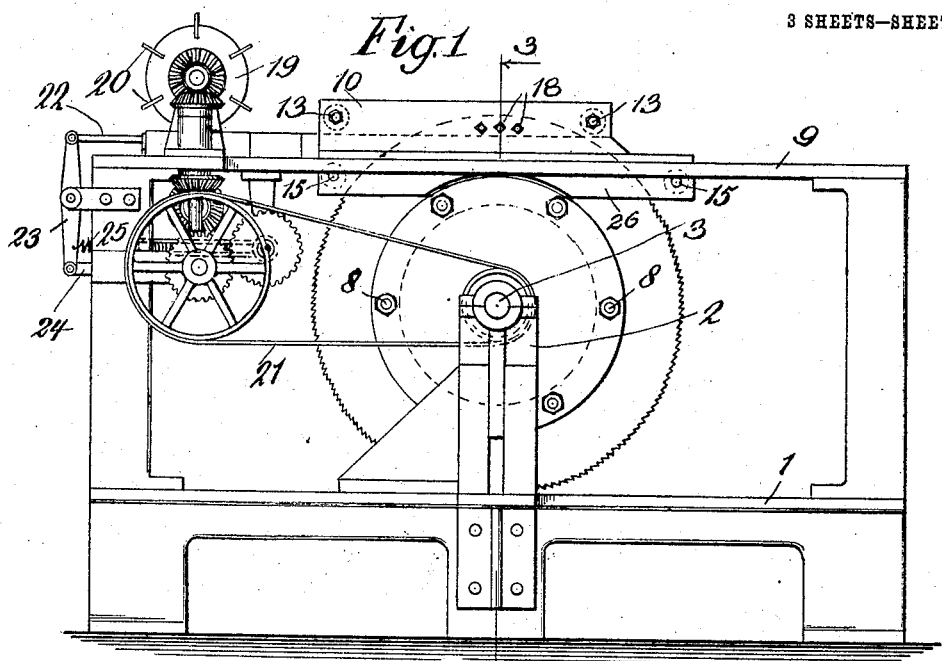
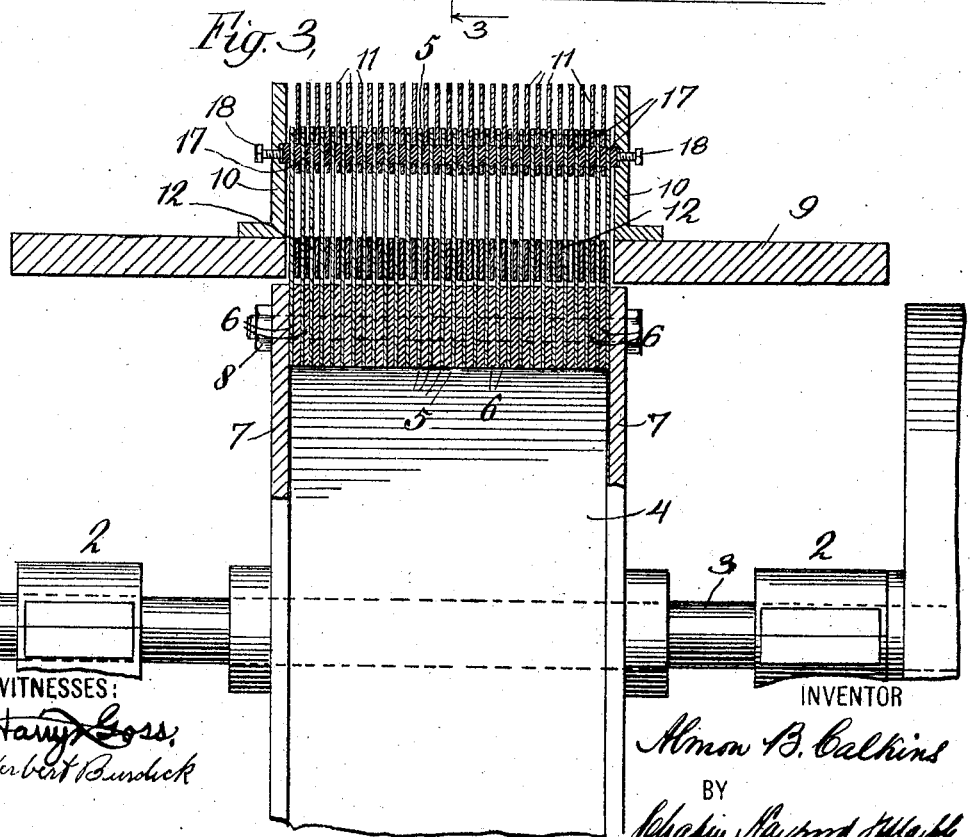
WITNESSES: INVENTOR
Harry Goss, Almon B. Calkins
Herbert Burdick BY
Chapin Rayford Hillabel
his ATTORNEYS No. 800,426. PATENTED SEPT. 26, 1905.
A. B. CALKINS.
CIRCULAR SAW.
APPLICATION FILED AUG. 2, 1904.
3 SHEETS—SHEET 2.
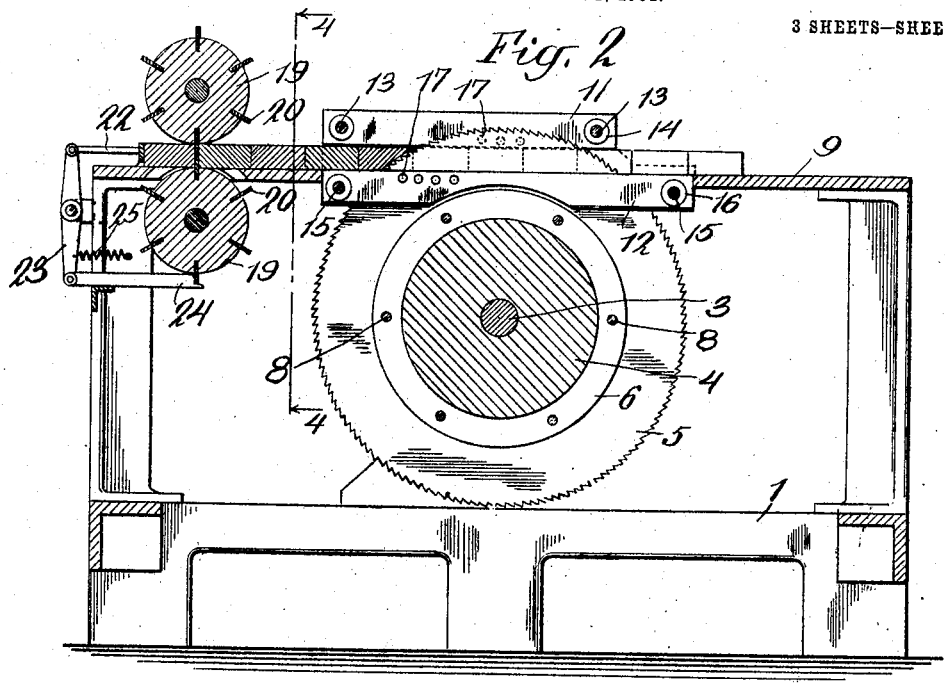
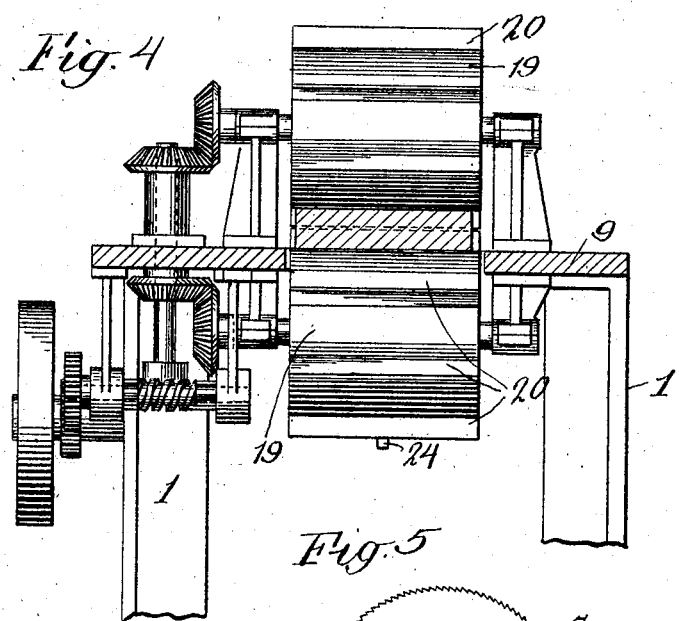
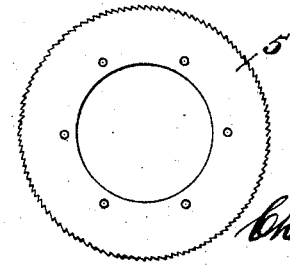
WITNESSES:
Harry Goss
Herbert Burdick
INVENTOR
Almon B. Calkins
BY
Chapin Hayford Marble
his ATTORNEYS No. 800,426. PATENTED SEPT. 26, 1905.
A. B. CALKINS.
CIRCULAR SAW.
APPLICATION FILED AUG. 2, 1904.

3 SHEETS—SHEET 3.

WITNESSES:
Harry Goss
Benj. E. Teale

INVENTOR
Alson B. Calkins
BY
Chapin Rayford Mable
his ATTORNEYS

UNITED STATES PATENT OFFICE.

ALMON B. CALKINS, OF BELLEVILLE, NEW JERSEY, ASSIGNOR TO AMERICAN MATCH MANUFACTURING COMPANY, OF NEW YORK, N. Y., A CORPORATION OF NEW JERSEY.

CIRCULAR SAW.

No. 800,426.      Specification of Letters Patent.      Patented Sept. 26, 1905.

Application filed August 2, 1904. Serial No. 219,158.

*To all whom it may concern:*

Be it known that I, ALMON B. CALKINS, a citizen of the United States of America, and a resident of Belleville, county of Essex, State of New Jersey, have invented certain new and useful Improvements in Circular Saws, of which the following is a specification, reference being had to the accompanying drawings, forming a part thereof.

My invention relates to improvements in circular saws, and particularly to circular saws and gang sawing machinery for sawing blocks of wood into veneer. Saws adapted for this purpose need to be very thin, in order that there shall be as little waste of material operated upon as possible, and should revolve at an extremely high rate of speed. With ordinary circular saws of the common disk form there is a limit to the running speed, because of the tendency to buckle, due to unequal heating, and it is desirable in this class of machinery to run the saws at a rate of speed much beyond this limit. To this end I have devised a circular saw comprising a peripherally-toothed ring or annulus, and in carrying out my invention I employ a plurality of these saws arranged around a drum carrying them. An annulus of this description will heat more evenly throughout than will a disk, and the tendency of the same to buckle will be largely reduced. Hence I am enabled to run the saw at a higher rate of speed than would be otherwise possible. Further, it will be seen that in heating up an annulus may expand radially without seriously buckling the same, while a disk being held by the central portion from expanding radially will necessarily buckle. I also employ holding or steadying devices, which engage opposite sides of the saws above and below the material fed thereto, and by this means should any buckling occur throughout the annulus or ring comprising a saw the operating portion thereof will be held steady and will remain properly spaced from contiguous saws, so that veneers of uniform thickness will result.

My invention is particularly designed for the purpose of severing blocks of wood into veneer cards about one-tenth of an inch in thickness, to be finally subdivided into splints for employment in the manufacture of matches, and as a result thereof I am enabled to obtain an exceedingly uniform veneer with a minimum loss in the saw-kerf.

My invention further consists in certain novel details of construction and combination of parts, as will hereinafter more fully appear.

I will now proceed to describe a machine embodying my invention and will then point out the novel features in claims.

Figure 7:
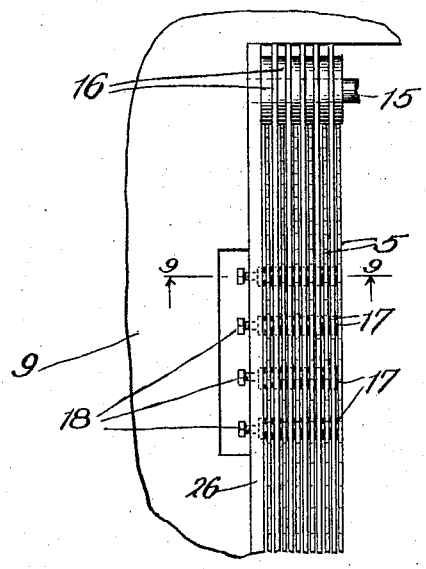
Figure 8:
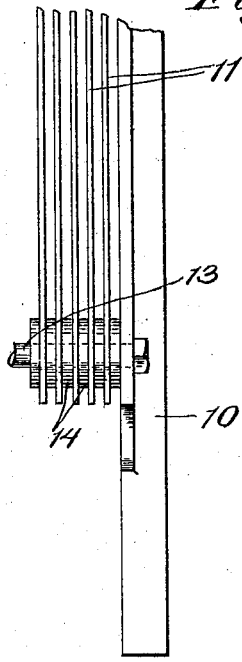
Figure 9:
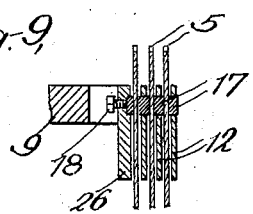

In the drawings, Figure 1 is a view in end elevation of a machine embodying my invention. Fig. 2 is a view in central transverse section therethrough. Fig. 3 is a view in longitudinal section substantially upon the plane of the line 3 3 of Fig. 1. Fig. 4 is a detail view, in transverse section, of certain feeding devices employed, the plane of section being upon the line 4 4 of Fig. 2. Fig. 5 is a detail view of one of the saw-rings removed. Figs. 6, 7, 8, and 9 are fragmentary detail views showing more particularly the means for supporting the upper and lower bars which carry the steadying-plugs.

The frame 1 of the machine supports suitable bearings 2 for the saw-shaft 3. The saw-shaft 3 carries a drum 4 of a diameter preferably not less than one-half the diameter of the saws. It is here shown of a diameter somewhat greater than one-half the diameter of the saws, and so far I consider that the larger the diameter of the drum with respect to the saw the better the results I am likely to obtain. The saws comprise each a peripherally-toothed ring or annulus 5, one of which is shown in detail in Fig. 5. The interior diameter of the rings 5 is substantially equal to the exterior diameter of the drum 4, by which they are carried. Intermediate each of the saws is a spacing ring or washer 6, and side plates 7 are provided at each end of the drum, said side pieces preferably having a diameter about equal to the outside diameter of the said rings or spacing-pieces 6. Bolts 8 pass through the saw-rings, the side plates, and the spacing-pieces and secure the parts firmly together. The side plates 7 are preferably keyed or otherwise secured to the saw-shaft 3.

The saw-bed 9 is supported upon the frame 1 of the machine and itself acts as a supporting-plate for brackets 10, carrying holding or steadying devices for the saws. These holding or steadying devices comprise a plurality of bars 11, arranged above the level of the bed, and another plurality of bars 12, arranged flush with or below the level of the bed. The bars 11 are strung upon bolts 13, secured to the brackets 10, and thimbles or spacing-pieces 14 maintain the bars the proper distance apart. The bars 12 are strung along similar bolts 15, supported by end plates 26, secured to the frame 1 of the machine, and thimbles 16 in like manner act as spacing-pieces to space them the proper distance apart. The width of the bars 11 and 12 is somewhat less than the distance between the saws, so that they will be out of contact therewith at all times; but the said bars are provided with loosely-inserted plugs 17, of antifriction metal, which extend beyond the sides thereof and engage the faces of the saw-rings, so as to guide and steady them. Set-screws 18 opposite the plugs 17 may be employed to take up any slight variation which may exist; but it will be understood that the plugs are intended to be of just exactly the length to properly engage the saw-faces so as to steady them without applying undue friction thereto, the function of the set-screws 18 being to take up but very slight variations. As explained, the bars 11 will be some distance above the level of the bed or table 19, preferably such a distance as just to permit the work to be acted upon to pass beneath them, while the upper edges of the bars 12 will preferably be about flush with the surface of the table 9, so that the work will substantially fit between the lower faces of the bars 11 and the upper faces of the bars 12. The antifriction-plugs 17 will preferably be as near the lower edge of the plates 11 and the upper edge of the plates 12 as is possible, so that the saws will be steadied as close to the work as practicable. By this arrangement it will be seen, first, that the saw-rings will have but a very small tendency to buckle, even though they may be made of very thin material, because, being of ring-like instead of disk-like form, they will heat more uniformly throughout; second, in heating the rings may expand radially with but slight tendency to buckle; third, the ring-like form permits a greater percentage of the saw-body to be employed in the work than would be possible in a disk form, whereby the surface friction throughout the saw is more uniform, and, fourth, should the saw-rings buckle the alinement at the operating-point will be maintained because of the antifriction spacing devices employed.

I have shown feeding means for the material to be operated upon comprising two paddle-wheels 19, geared to rotate together and provided with peripheral feed-blades 20, the said wheels driven by a belt connection 21 from the saw-shaft 3 through suitable gearing, such as will give the proper direction and speed thereto. A pusher 22 is provided, operated by a rocking lever 23, controlled by a detent 24, which engages successive paddle-blades 20 of the lowermost feed-wheel. The feed-wheels rotate continuously, but give an intermittent impulse to the detent 24, rocker 23, and pusher 22, a spring 25 operating to return the parts to a normal position between each movement forward, at which time a new block may be dropped in front of the pusher to be fed to the feed-wheels at the next impulse given thereto.

What I claim is—

1. In sawing machinery, the combination with a plurality of circular saws, of two sets of bars arranged between contiguous saws, but out of contact therewith, metallic plugs carried by said bars of each set projecting beyond the sides thereof, arranged to engage the side faces of adjacent saws, but to clear the teeth thereof, and means for feeding work to be operated upon between the two sets of bars.

2. In sawing machinery, the combination with a plurality of circular saws, or means for feeding work thereto, and steadying devices for the saws, arranged to engage the side faces thereof at points above and below the point at which they engage the work and within the teeth-line thereof, said devices including supporting means arranged between, but clear of, the teeth of adjacent saws.

3. In sawing machinery, the combination with a circular saw, of means for feeding work thereto, and steadying devices for the saw, arranged to engage the side faces thereof at points above and below the point at which it engages the work but clear of, and out of contact with, the peripheral teeth thereof.

4. In sawing machinery, the combination with a plurality of circular saws, and steadying devices located freely between them, near the peripheries thereof, and arranged longitudinally in a line, of take-up means for the steadying devices arranged at the end thereof, substantially as specified.

5. In sawing machinery, the combination with a plurality of saws, steadying devices located between them, near the peripheries thereof, and in a line with each other, bars freely supporting the said steadying devices, and take-up devices opposite the ends of the line of steadying devices.

6. In sawing machinery, the combination with a plurality of circular saws, of a set of bars arranged between them, plugs freely mounted in said bars and projecting laterally therefrom upon opposite sides of the said bars to engage the side faces of adjacent saws, and an end adjusting-screw for simultaneously adjusting all the said plugs.

7. In sawing machinery, the combination with a plurality of circular saws, each comprising a peripherally-toothed annulus or ring, and a drum carrying same, of means for steadying the saws at points near the peripheries thereof, but out of contact with the teeth of said saws, said steadying devices engaging the side faces of the saws above and below the point at which the said saws engage the work to be operated upon.

In witness whereof I have hereunto set my hand this 29th day of July, 1904.

ALMON B. CALKINS.

Witnesses:
 HENRY STAIER,
 CHAS. W. DRAKE.